United States Patent
Yamamoto (10) Patent No.: US 8,223,394 B2
(45) Date of Patent: Jul. 17, 2012

(54) IMAGE-FORMING APPARATUS, IMAGE-FORMING METHOD, AND RECORDING MEDIUM

(75) Inventor: Yoshikazu Yamamoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 938 days.

(21) Appl. No.: 11/640,315

(22) Filed: Dec. 18, 2006

(65) Prior Publication Data

US 2008/0007800 A1 Jan. 10, 2008

(30) Foreign Application Priority Data

Jun. 30, 2006 (JP) .................................. 2006-181886

(51) Int. Cl.
 *H04N 1/04* (2006.01)
 *G06F 15/00* (2006.01)
(52) U.S. Cl. ........ 358/1.9; 358/498; 358/1.15; 358/496; 358/497; 358/412; 358/1.5; 347/116; 347/16
(58) Field of Classification Search .................. 358/498, 358/1.15, 1.9, 496, 497, 412, 1.5; 347/116, 347/16
See application file for complete search history.

(56) References Cited

U.S. PATENT DOCUMENTS

| 4,888,635 A * | 12/1989 | Harada et al. ................. 358/509 |
| 5,448,345 A * | 9/1995 | Uto et al. ....................... 399/367 |
| 2002/0089560 A1* | 7/2002 | Katayama et al. ............. 347/16 |

FOREIGN PATENT DOCUMENTS

JP A 2005-172900 6/2005

* cited by examiner

*Primary Examiner* — David K Moore
*Assistant Examiner* — Quang N Vo
(74) *Attorney, Agent, or Firm* — Oliff & Berridge, PLC (57) ABSTRACT

An image-forming apparatus includes: a supply section that supplies image data; an image-forming section that forms on a continuous sheet a toner image according to the image data; a conveyor section that conveys the continuous sheet; and a control section that controls operations of the conveyor section and the image-forming section. If a first toner image according to first image data and a second toner image according to second image data are formed on the continuous sheet, the control section controls conveyance of the continuous sheet so as not to be halted until the second toner image is formed if the second image data is supplied before a predetermined time period elapses from when the first toner image is formed, or so as to be stopped if the second image data is not supplied before the predetermined time period elapses from when the first toner image is formed.

20 Claims, 4 Drawing Sheets

IMAGE-FORMING APPARATUS, IMAGE-FORMING METHOD, AND RECORDING MEDIUM

BACKGROUND OF THE INVENTION

1. Field of the Invention

The present invention relates to an image-forming apparatus and an image-forming method according to an electrophotographic process used for creating printed material such as newspapers, and also to a recording medium used for the apparatus and method.

2. Description of the Related Art

Conventionally, printed materials for publication, such as newspapers, are produced using printing machines. However, it has become increasingly common for electrophotographic image-forming apparatuses to be used in place of printing machines for producing printed materials. An advantage of using such an apparatus is that it is not necessary to prepare a block copy set. Accordingly, an electrophotographic image-forming process is particularly suited for use in producing small job lots of printed materials.

In an image-forming apparatus for use in an electrophotographic process it is preferable to employ a so-called tandem scheme, whereby an image forming unit for each of four colors: yellow (Y), magenta (M), cyan (C), and black (K), is provided in series. To form images on each of two surfaces of a sheet, it is also preferable to provide a set of four such units for both a front and a rear surface of a sheet. Further, a front/back reversing device is preferably provided between the respective 4 front surface and 4 rear surface of image-forming units. A sheet suitable for use with such an image-forming apparatus is exemplarily a pin-less continuous sheet. The term "continuous sheet" is used herein to refer to a long sheet-type material which is fed sequentially from a roll on which the material is wound. Such a sheet may also commonly be referred to in the art as a roll sheet, a reel-fed sheet, or a web sheet.

SUMMARY

In the image-forming apparatus having the structure described above, eight image-forming units and a front/back reversing device are provided in series. This arrangement causes a distance over which a sheet is required to be conveyed, to be lengthened. As a result, a conveyed sheet is liable to move in an unstable manner at a start of conveyance due to structural and mechanical factors. Instability at the start of conveyance gives rise to a meander movement in the conveyed sheet. When meander occurs at a time that an image-forming apparatus according to the tandem scheme is forming an image, positions of toner images of respective colors become displaced in relation to one another, and color drift occurs. To form images using such an apparatus which is not prone to color drift, it is necessary to delay a start of image formation for a certain period following start of conveyance of a sheet, so as to allow meander of the sheet to stabilize. Thus, to ensure that an image is formed without color drift, a sheet on which the image is to be formed is subject to a "preparatory period" during which the sheet is conveyed without any image formation operation being carried out. However, use of such a preparatory operation can result in a loss of as much as 200 meters of sheet. Moreover, since image formation does not take place during the preparatory operation, a significant amount of image-formation time is lost, and a relatively long time is thereby required to complete an image-forming operation.

According to an aspect of the invention, there is provided an image-forming apparatus including: a supply section that supplies image data; an image-forming section that forms on a continuous sheet a toner image according to the image data supplied from the supply section; a conveyor section that conveys the continuous sheet at least while the toner image is being formed by the image-forming section; and a control section that controls operations of the conveyor section and the image-forming section, wherein if a first toner image according to first image data and a second toner image according to second image data are formed on the continuous sheet, the control section controls conveyance of the continuous sheet so as not to be halted until the second toner image is formed if the second image data is supplied to the image-forming section before a predetermined time period elapses from when the first toner image is formed, or so as to be stopped if the second image data is not supplied before the predetermined time period elapses from when the first toner image is formed.

BRIEF DESCRIPTION OF THE DRAWINGS

An embodiment of the present invention will now be described in detail with reference to the following figures, wherein.

DETAILED DESCRIPTION

An exemplary embodiment of the present invention will now be described below with reference to the drawings.

Structure

Figure 1:
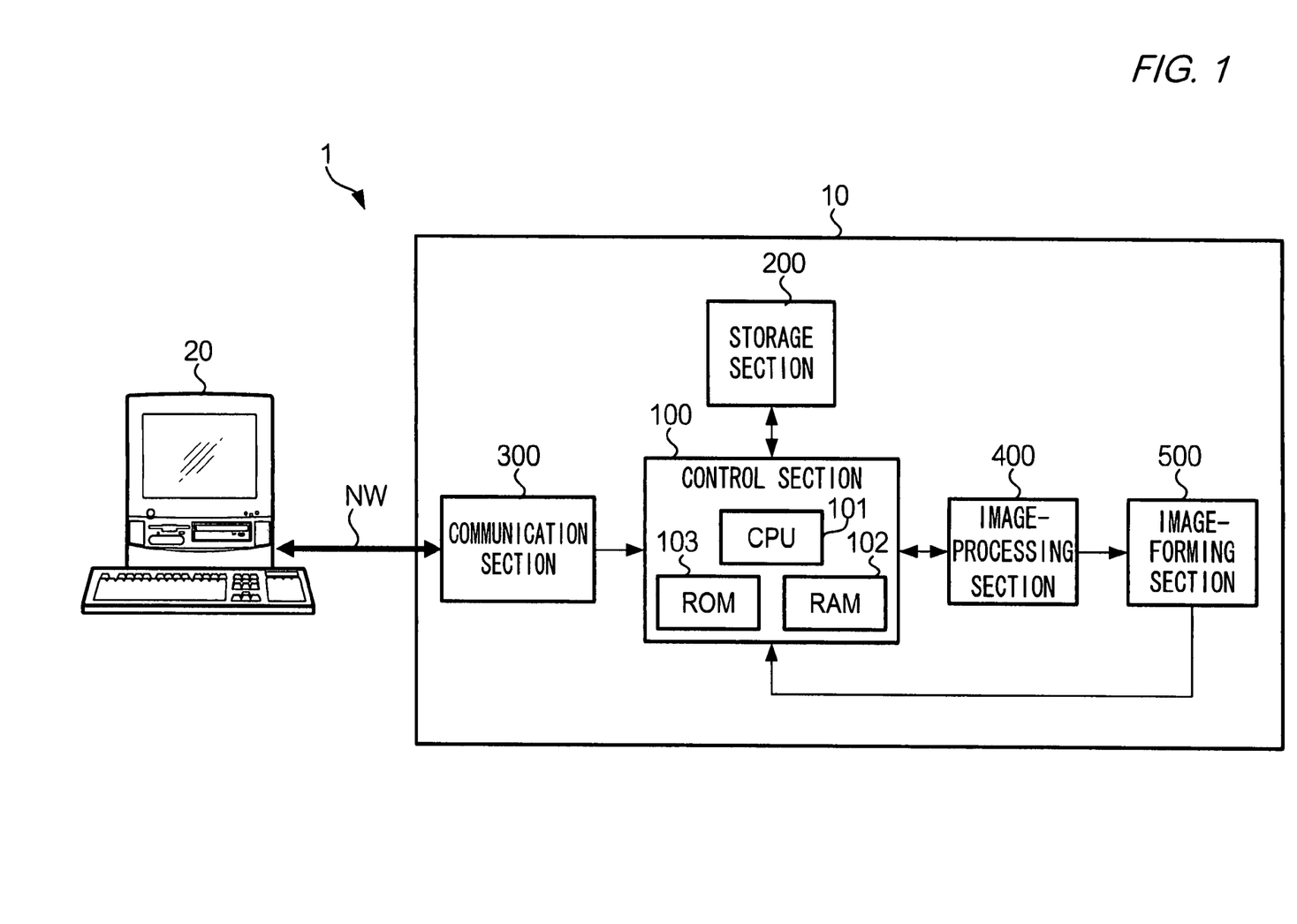
FIG. 1 is a block diagram showing a schematic structure of an image-forming system according to an embodiment of the present invention.

FIG. 1 is a block diagram showing a schematic structure of an image-forming system 1 according to an embodiment of the invention. As shown in the figure, the image-forming system 1 is constituted by connecting a host apparatus 20 and an image-forming apparatus 10 via a network NW such as a LAN (Local Area Network). The host apparatus 20 is a computer device such as a personal computer manipulated by an operator with image data and various instructions for the image-forming apparatus 10. The image-forming apparatus 10 is a printer according to an electrophotographic scheme and serves mainly to create printed materials such as newspapers. The structure of the image-forming apparatus 10 is roughly divided into a control section 100, storage section 200, communication section 300, image-processing section 400, and image-forming section 500.

The control section 100 is an arithmetic unit having a CPU (Central Processing Unit) 101, a RAM (Random Access Memory) 102, and a ROM (Read Only Memory) 103. The CPU 101 uses the RAM 102 as a work area, and controls each section of the image-forming apparatus 10 in accordance with a program stored in the ROM 103. The image-forming apparatus 10 has a timer function of measuring elapsed time according to a predetermined timing. The storage section 200 is a storage device such as a flash memory, and stores various data such as image data (resister marks) for position alignment, which are used in a process for correcting position displacements as will be described later. The communication section 300 is an interface device for connecting a network NW. The communication section 300 receives image data and various instructions from the host apparatus 20 and supplies the received data and instructions to the control section 100. The image-processing section 400 is an image-processing device constituted by an ASIC (Application Specific Integrated Circuit) or the like. The image-processing section 400 performs a processing (rasterizing processing) of generating image data (hereinafter "raster data") in bitmap format from inputted image data, corresponding to toner colors. The image-processing section 400 may further perform image processing such as color correction in addition to the rasterizing processing.

Figure 2:
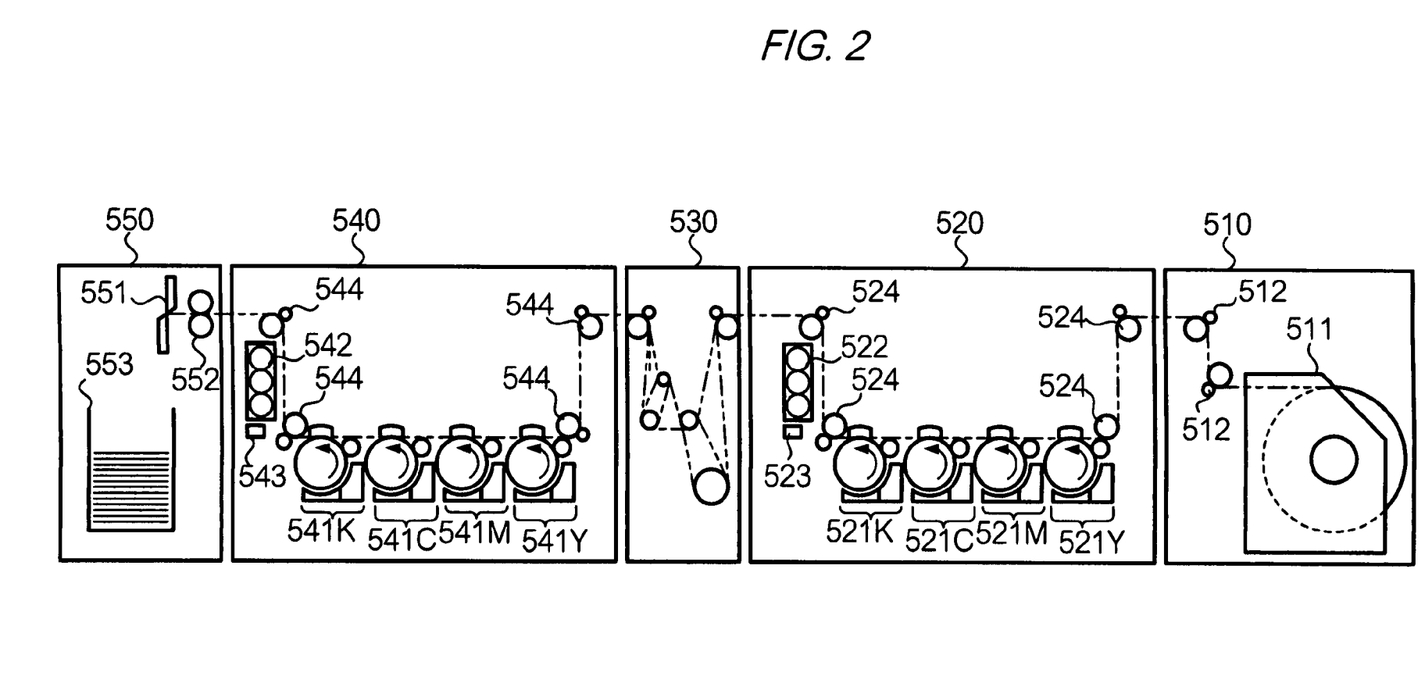
FIG. 2 shows a structure of an image-forming section in an image-forming apparatus according to the embodiment.

FIG. 2 shows a structure of the image-forming section 500. This figure shows a sheet-conveying path drawn by a two-dot chain line. As shown in the figure, the structure of the image-forming section 500 is roughly divided into a sheet supply section 510, front image-forming section 520, front/back reversing section 530, back image-forming section 540, and post processing section 550. The sheet supply section 510 includes a container box 511 and plural conveyor rolls 512. The container box 511 contains a sheet and feeds out the sheet in accordance with an instruction from the control section 100. The conveyor rolls 512 convey the sheet contained in the container box 511 in a downstream direction (toward the post processing section 550) at a predetermined speed. The sheet in the present embodiment is a long so-called continuous sheet. The material of the sheet is paper (cellulose) in general, but is not limited only to paper.

The front image-forming section 520 includes image-forming units 521Y, 521M, 521C, and 521K, a flash fixture device 522, a mark sensor 523, and plural conveyor rolls 524. Each of the image-forming units 521Y, 521M, 521C, and 521K includes a photosensitive drum, a charger, an exposure device, a development device, a transfer member, and the like, and transfers to a sheet a toner image according to supplied image data. The image-forming units 521Y, 521M, 521C, and 521K respectively form yellow (Y), magenta (M), cyan (C), and black (K) toner images. The flash fixture device 522 has a light source such as a xenon lamp, and melts and fixes a toner image transferred to the sheet, by radiant heat from the light source. Specifically, the light source of the flash fixture device 522 functions also as a heat source. This light source is configured to be able to be turned off upon necessity. The mark sensor 523 is an optical sensor which detects register marks of respective colors transferred to the sheet. The mark sensor 523 supplies the control section 100 with a detection signal indicative of a detection result concerning register marks. The register marks are, for example, cross images such as so-called cross hairs. Displacements between toner images of respective colors can be detected by displacements between the register marks of respective colors. The conveyor rolls 524 support the sheet at their own positions and convey the sheet in the downstream direction.

The front/back reversing section 530 conveys the sheet, reversing front and back surfaces thereof. A known front/back reversing device used in printing machines can also be used as the front/back reversing section 530. The back image-forming section 540 has the same structure as the front image-forming section 520. Image-forming units 541Y, 541M, 541C, and 541K, a flash fixture device 542, a mark sensor 543, and conveyor rolls 544 respectively have the same functions as the image-forming units 521Y, 521M, 521C, and 521K, flash fixture device 522, mark sensor 523, and conveyor rolls 524. The post processing section 550 includes a cutter 551, conveyor rolls 552, and a stacker 553. The cutter 551 cuts the sheet in a direction perpendicular to the conveying direction, into pieces each having a predetermined size. The conveyor rolls 552 support the sheet at their own positions and convey the sheet in the downstream direction. The pieces of the sheet cut by the cutter 551 are stacked in the stacker 553.

Operation

In the image-forming system 1 with the structure as described above, the host apparatus 20 supplies image data, and the image-forming apparatus 10 forms images according to the image data on a sheet. Further, descriptions will now be made of operations which the image-forming apparatus 10 performs in a case where a series of image data expressing a predetermined printed material is sequentially inputted. In the description below, two examples are cited as operations performed by the image-forming apparatus 10.

For the sake of simplifying the description, image data in the following descriptions refer to a unit of data expressing a plurality of images set out in an image area having a predetermined size. One unit of image data is supposed to include front surface image data and back surface image data. A set of paired front surface image data and back surface image data which have been set out is supposed to be equivalent to image data of one page. That is, a "page" in this embodiment is defined as images formed on one cut piece of the sheet and thus has a different meaning to that of a "page" in actual printed materials.

Operation Example 1

Figure 3:
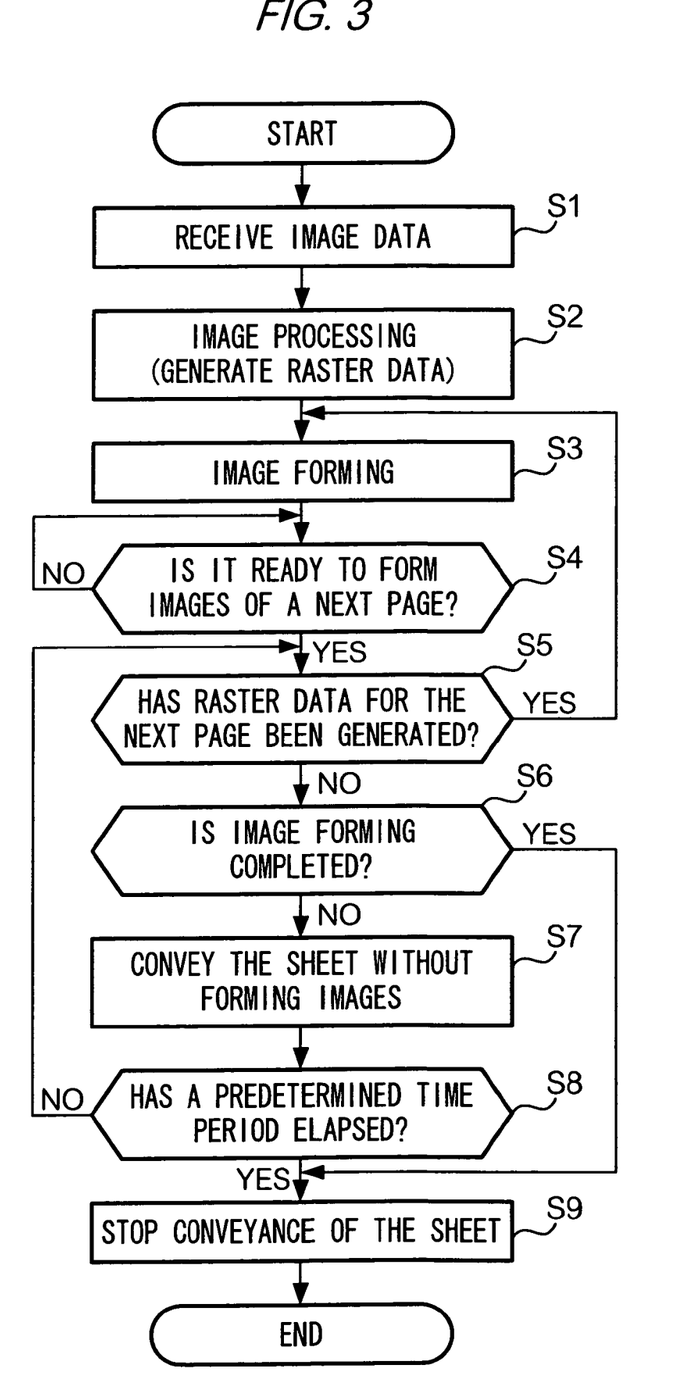
FIG. 3 is a flowchart showing the first operation example of the image-forming apparatus according to the embodiment.

FIG. 3 is a flowchart showing the first operation example. A description will be made of the processes shown in the flowchart. The control section 100 of the image-forming apparatus 10 first receives image data from the host apparatus 20 (step S1). Subsequently, the control section 100 supplies the image-processing section 400 with the received image data, so that the section 400 is made to execute an image processing such as a rasterizing processing to generate raster data for each of the colors Y, M, C, and K. The raster data includes a part corresponding to front surface image data, and a part corresponding to back surface image data.

After the necessary raster data is generated, the control section 100 supplies the raster data to the image-forming section 500 and causes the section 500 to form images according to the raster data (step S3). At this time, the image-forming section 500 forms an image corresponding to the front surface image data. The front/back reversing section 530 reverses the front and back surfaces of the sheet. The back image-forming section 540 forms an image corresponding to the back surface image data. The post processing section 550 cuts the sheet and so forth. While this series of processing is being executed, the sheet supply section 510 keeps feeding the sheet at a predetermined conveying speed.

After instructing the image-forming section 500 to form images, the control section 100 determines whether each section in the image-forming section 500 is ready to form images of the next page or not (step S4). If the image-forming section 500 is ready to form images of the next page (step S4; YES), the control section 100 further determines whether raster data corresponding to the next page has been generated or not (step S5). If the raster data has already been generated (step S5; YES), the control section 100 executes the aforementioned processing from step S3 in the same manner as described above.

However, there may occur a situation in which transfer of image data from the host apparatus 20 is delayed for some reason, or an image processing takes longer than usual, for example. This may result in the raster data corresponding to images of a next page not having been regenerated although the image-forming section 500 is ready to form images of a next page. In this case (step S5; NO), the control section 100 determines whether image formation by the image-forming section 500 should be terminated or not (step S6). For example, if an operator has instructed termination of the image-forming operation or if images corresponding to image data of the last page have already been formed, the control section 100 determines termination of the image-forming operation (step S6; YES), and stops the image-forming section 500 from conveying the sheet (step S9). At this time, the control section 100 may simultaneously stop operations of the flash fixture device 522 and the image-forming units 521Y, 521M, 521C, and 521K.

Otherwise, if no instruction is given to terminate the image-forming operation or if image data of a final page has not yet been inputted, the image-forming operation is continued thereafter. In this case, the control section 100 therefore determines that the image-forming operation should not be terminated (step S6; NO). The control section 100 then allows the sheet to be conveyed while inhibiting image formation (step S7).

At this time, the light source of the flash fixture device 522 is desirably turned off when an area containing no transferred toner image on the sheet passes a position at which the flash fixture device 522 is provided.

While continuously conveying the sheet, the control section 100 measures a time period for which the sheet is being conveyed without allowing image formation. The control section 100 also determines whether this time period has reached a predetermined length or not (step S8). At this time, the predetermined length may be an arbitrary value. For example, a time period required for a preparatory operation can be applied as the predetermined length, i.e., a time period necessary for the image-forming section 500 to become ready to stably form toner images commencing from the start of an operation of section 500.

If the time period for which the sheet is conveyed without forming images has not yet reached the predetermined time period (step S8; NO), the control section 100 repeats the processing from step S5. Then, if the rastering processing ends and necessary raster data is generated (step S5; YES), the control section 100 causes the image-forming section 500 to form images on the sheet, according to the raster data (step S3). Otherwise, if the predetermined time period is exceeded (step S8; YES), the control section 100 stops the image-forming section 500 from conveying the sheet (step S9). Conveyance of the sheet is thus stopped in a case, for example, that the sheet is conveyed beyond the predetermined time period, the conveyed length of the sheet (or loss of the sheet) is greater than if conveyance of the sheet is once stopped.

Through execution of the processing as described above, the image-forming apparatus 10 according to this embodiment is able to continue operating without stopping conveyance of the sheet in so far as the image-forming operation can be restarted after a short waiting period.

Operation Example 2

The second operation example will be described next. This operation example is a partial modification of the first operation example and follows operations in the same manner as shown in the flowchart of FIG. 3. Therefore, the following description will be mainly directed to differences in the second operation example, and overlapping description will be omitted.

Figure 4:
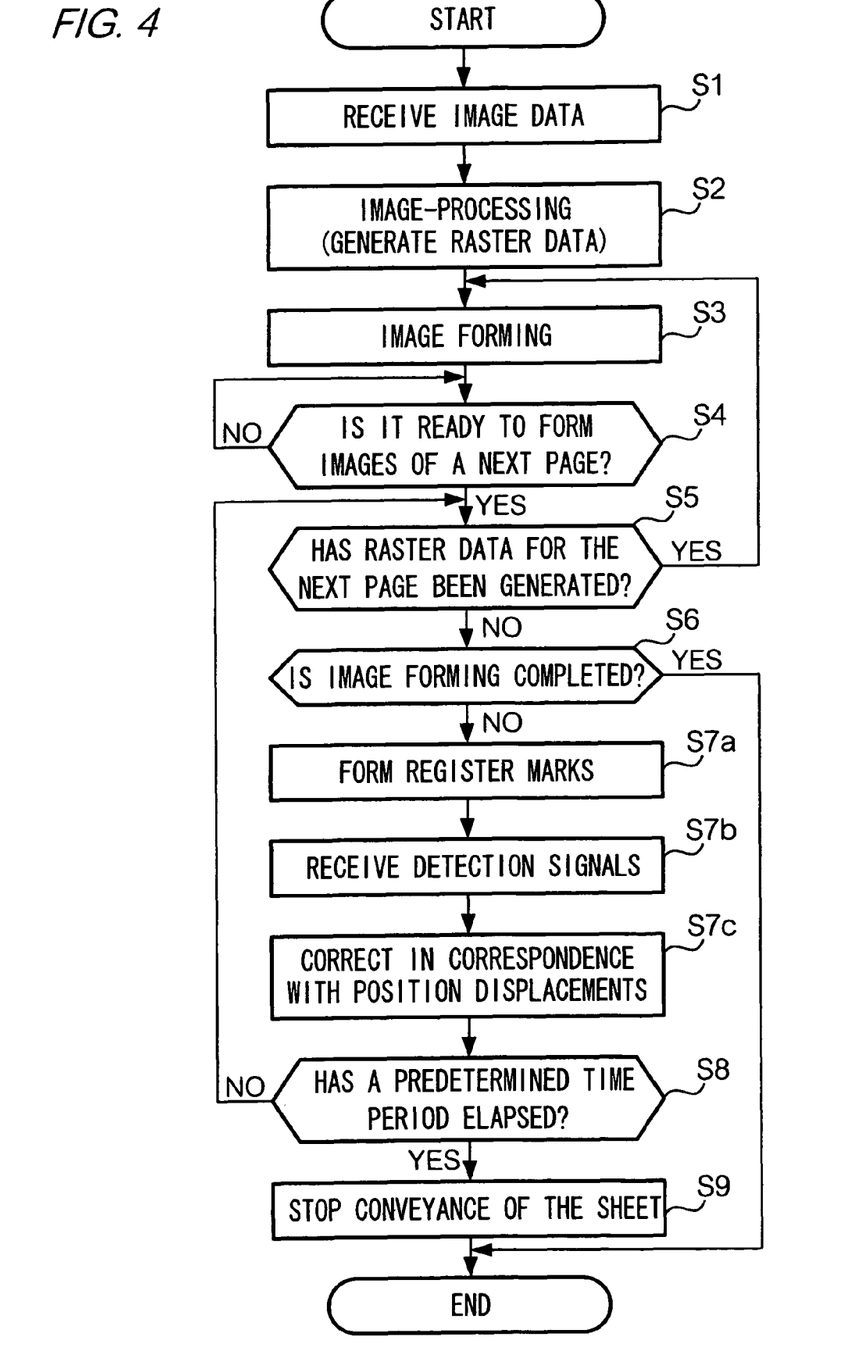
FIG. 4 is a flowchart showing the second operation example of the image-forming apparatus according to the embodiment.

FIG. 4 is a flowchart showing the second operation example of the image-forming apparatus 10. In this figure, those steps that execute the same processing as shown in the flowchart of FIG. 3 are denoted by the same reference symbols. That is, operation of the image-forming apparatus 10 in the present example differs from the first operation example mainly with respect to processing that is executed while waiting for raster data of a next page.

In the present operation example, if raster data corresponding to a next page has not yet been generated, the control section 100 of the image-forming apparatus 10 allows formation of register marks while continuing conveying of the sheet (step S7a). Register marks for respective colors are detected by each of mark sensors 523 and 524. The control section 100 receives the detection signals for each of the colors (step S7b). After receiving a detection signal for each color, the control section 100 detects position displacements between toner images of respective colors, based on positions of the register marks of these colors, which are indicated by the detection signals. The control section 100 performs corrections equivalent to the displacements (step S7c). The corrections performed at this time can be performed by an arbitrary method. For example, corrections can be performed by adjusting exposure timing of the image-forming unit for each color.

Please note that corrections made to position displacements are effective only if image formation is further continued thereafter (without stopping conveying of the sheet). Therefore, it is desirable that these operations as well as the conveyance of the sheet are immediately stopped if an operator inputs an instruction to stop the image-forming operation while register, marks are being formed or while position displacements are being corrected, for example.

Modifications

The above description deals with examples of an embodiment of the invention. However, the invention is not limited to the embodiment described above but may be practiced in various modifications. For example, modifications described below are applicable to the foregoing embodiment. Besides, these modifications can be appropriately combined with one another.

Firstly, the structure of the image-forming apparatus is not limited to the embodiment described above. For example, the structure may be arranged so as to fix toner images by heating and pressing in place by a fixing process dependent on the flash fixing device. In addition, different numbers of colors are available, although image-forming units for the four colors: Y, M, C, and K are implemented in the above embodiment.

Also in the above embodiment, the rasterizing processing is executed by the image-processing section of the image-forming apparatus. However, the structure may be arranged such that the rasterizing processing is executed by a calculator dedicated to the execution of the rasterizing processing. The image-forming apparatus may be configured so as to receive raster data which has been subjected to rasterizing processing in advance.

Also in the above embodiment, whether conveyance of the sheet should be stopped or not is determined based on a measured time period. However, conveyance of the sheet can be controlled based on a different parameter to the time period. An example thereof, will be a conveyed length of the sheet. A feed amount of the sheet can be calculated by multiplying a conveying speed by a conveying time period. The conveying speed of the sheet can be a pre-stored value or can be detected by a sensor.

Further, the above embodiment does not particularly restrict processing to be performed afterward on such a part of the sheet that has been conveyed with no image formed thereon or that has register marks formed thereon (i.e., a wasted part of the sheet). Such a waste part of the sheet should desirably be distinguished clearly from the other parts of the sheet which are used for printing. Hence, separate stackers may be provided respectively to contain cut pieces of the sheet used for printed materials and to contain waste cut pieces of the sheet. Used cut pieces and waste cut pieces of the sheet may be conveyed through different paths. Otherwise, a notch or mark may be formed on each waste cut piece of the sheet, to allow the cut piece to be recognized clearly as a waste part of the sheet.

What is claimed is:

1. An image-forming apparatus which conveys a continuous sheet without forming an image on the continuous sheet from commencement of a conveyance process until the conveyance process is stabilized, the image-forming apparatus comprising:
   an image processing section that generates raster data for a plurality of pages, the raster data being generated by a rasterizing process;
   an image-forming section that forms on the continuous sheet a toner image according to the raster data generated by the image processing section;
   a conveyor section that conveys the continuous sheet at least while the toner image is being formed by the image-forming section;
   a control section that controls operations of the conveyor section and the image-forming section; and
   a determining unit that determines, in a case that a first toner image corresponding to first image data and a second toner image corresponding to second image data are formed on the continuous sheet, whether the second image data are provided to the image-forming section until a predetermined time period elapses from when the first toner image is formed on the continuous sheet, the second image data being subsequent to the first image data, wherein
   if the determining section determines that the second image data are provided before the predetermined time period elapses from when the first toner image is formed, the control section is configured to control the image-forming section to form the second toner image and to control the conveyor section to continue conveying the continuous sheet, and
   if the determining section determines that the second image data are not provided before the predetermined time period elapses from when the first toner image is formed, the control section is configured to control the image-forming section not to form a toner image and to control the conveyor section to continue conveying the continuous sheet until the predetermined time period elapses, and control the conveyor section to stop conveying the continuous sheet when the predetermined time period has elapsed.

2. The image-forming apparatus according to claim 1, further comprising:
   a detection section that detects a position of the toner image formed on the continuous sheet by the image-forming section; and
   a correction section that corrects the position of the toner image, based on a detection result from the detection section, wherein
   the control section causes the image-forming section to form a toner image indicative of a predetermined mark if a second raster data is not supplied to the image-forming section before the predetermined time period elapses from when the first toner image is formed, and
   based on a detection result concerning the toner image indicative of the predetermined mark, the correction section corrects the position of the toner image.

3. The image-forming apparatus according to claim 1, wherein
   the image-forming section includes a transfer section that transfers the toner image according to the raster data to the continuous sheet conveyed by the conveyor section, and a fixture section that heats the continuous sheet at a predetermined position, the continuous sheet being conveyed by the conveyor section and having the toner image transferred by the transfer section, and
   the control section inhibits the fixture section from heating an area of the continuous sheet when the area passes through the predetermined position, the area existing between areas where the first and second toner images are respectively formed.

4. The image-forming apparatus according to claim 1, further comprising:
   a cutting section that cuts into a predetermined size the continuous sheet having at least a part where a toner image is formed by the image-forming section; and
   a container section that stacks pieces of the continuous sheet cut by the cutting section, wherein
   the control section causes the conveyor section to convey the cut pieces of the continuous sheet so as to be stacked in the container section such that cut pieces of the continuous sheet each having a toner image formed according to the raster data are distinguishable from cut pieces of the continuous sheet not having a toner image.

5. The image-forming apparatus according to claim 2, further comprising an input section that inputs an instruction to stop the image-forming section from forming a toner image, wherein
   if the instruction is inputted by the input section and if the image-forming section forming the toner image is indicative of the mark, the control section stops the image-forming section from forming the toner image indicative of the mark.

6. An image-forming method for an image-forming apparatus which conveys a continuous sheet without forming an image on the continuous sheet from commencement of a conveyance process until the conveyance process is stabilized, the image-forming apparatus, the method comprising:
   generating raster data for a plurality of pages, the raster data being generated by a rastorizing process;
   forming on the continuous sheet a toner image according to the generated raster data;
   conveying the continuous sheet at least while the toner image is being formed;
   controlling the conveying in a first operation mode and a second operation mode; and
   determining, in a case that a first toner image corresponding to first image data and a second toner image corresponding to second image data are formed on the continuous sheet, whether the second image data are provided, in the step of forming a toner image, until a predetermined time period elapses from when the first toner image is formed on the continuous sheet, the second image data being subsequent to the first image data, wherein if the determining determines that the second image data are provided before the predetermined time period elapses from when the first toner image is formed, controlling the step of forming a toner image to form the second toner image and controlling the step of conveying the continuous sheet to continue conveying the continuous sheet, and if the determining determines that the second image data are not provided before the predetermined time period elapses from when the first toner image is formed, controlling the step of forming a toner image not to form a toner image and controlling the step of conveying the continuous sheet to continue conveying the continuous sheet until the predetermined time period elapses, and to stop conveying the continuous sheet when the predetermined time period has elapsed.

7. The image-forming method according to claim 6, further comprising:

detecting a position of the toner image formed on the continuous sheet; and correcting the position of the toner image, based on the detected result, wherein the formed toner image is indicative of a predetermined mark if a second raster data is not supplied before the predetermined time period elapses from when the first toner image is formed, and based on a detection result concerning the toner image indicative of the predetermined mark, the position of the toner image is corrected.

8. The image-forming method according to claim 6, further comprising:

transferring the toner image according to the raster data to the conveyed continuous sheet; and heating the continuous sheet at a predetermined position, the continuous sheet being conveyed and having the transferred toner image, wherein the heating of an area of the continuous sheet is inhibited when the area passes through the predetermined position, the area existing between areas where the first and second toner images are respectively formed.

9. The image-forming method according to claim 6, further comprising:

cutting into pieces of a predetermined size the continuous sheet having at least a part where a toner image is formed; and stacking pieces of the cut continuous sheet, wherein the cut pieces of the continuous sheet are conveyed so as to be stacked such that cut pieces of the continuous sheet each having a toner image formed according to the raster data are distinguishable from cut pieces of the continuous sheet not having a toner image formed.

10. The image-forming method according to claim 7, further comprising:

inputting an instruction to stop forming a toner image, wherein if the instruction is inputted and if the image-forming section is forming the toner image indicative of the mark, formation of the toner image indicative of the mark is stopped.

11. A non-transitory computer readable storage medium storing a program causing a computer to execute a process for controlling an image-forming apparatus which conveys a continuous sheet without forming an image on the continuous sheet from commencement of a conveyance process until the conveyance process is stabilized, the image-forming apparatus, the process comprising:

generating raster data for a plurality of pages, the raster data being generated by a rasterizing process;

forming on the continuous sheet a toner image according to the generated raster data;

conveying the continuous sheet at least while the toner image is being formed;

controlling the conveying in a first operation mode and a second operation mode; and determining, in a case that a first toner image corresponding to first image data and a second toner image corresponding to second image data are formed on the continuous sheet, whether the second image data are provided, in the step of forming a toner image, until a predetermined time period elapses from when the first toner image is formed on the continuous sheet, the second image data being subsequent to the first image data, wherein if the determining determines that the second image data are provided before the predetermined time period elapses from when the first toner image is formed, controlling the step of forming a toner image to form the second toner image and controlling the step of conveying the continuous sheet to continue conveying the continuous sheet, and if the determining determines that the second image data are not provided before the predetermined time period elapses from when the first toner image is formed, controlling the step of forming a toner image not to form a toner image and controlling the step of conveying the continuous sheet to continue conveying the continuous sheet until the predetermined time period elapses, and to stop conveying the continuous sheet when the predetermined time period has elapsed.

12. The non-transitory computer readable storage medium according to claim 11, the process further comprising:

detecting a position of the toner image formed on the continuous sheet; and correcting the position of the toner image, based on the detected result, wherein the formed toner image is indicative of a predetermined mark if a second raster data is not supplied before the predetermined time period elapses from when the first toner image is formed, and based on a detection result concerning the toner image indicative of the predetermined mark, the position of the toner image is corrected.

13. The non-transitory computer readable storage medium according to claim 11, the process further comprising:

transferring the toner image according to the raster data to the conveyed continuous sheet; and heating the continuous sheet at a predetermined position, the continuous sheet being conveyed and having the transferred toner image, wherein the heating of an area of the continuous sheet is inhibited when the area passes through the predetermined position, the area existing between areas where the first and second toner images are respectively formed.

14. The non-transitory computer readable storage medium according to claim 11, the process further comprising:

cutting into pieces of a predetermined size the continuous sheet having at least a part where a toner image is formed; and stacking pieces of the cut continuous sheet, wherein the cut pieces of the continuous sheet are conveyed so as to be stacked such that cut pieces of the continuous sheet each having a toner image formed according to the raster data are distinguishable from cut pieces of the continuous sheet not having a toner image formed.

15. The non-transitory computer readable storage medium according to claim 12, the process further comprising:
inputting an instruction to stop forming a toner image, wherein
if the instruction is inputted and if the image-forming section is forming the toner image indicative of the mark, formation of the toner image indicative of the mark is stopped.

16. The image-forming apparatus according to claim 1, wherein the control section measures a time period for which the sheet is being conveyed without allowing image formed on and determines whether the time period has reached the predetermined length of time.

17. The image forming method according to claim 6, further comprising:
measuring a time period for which the sheet is being conveyed without allowing image formation; and
determining whether the time period has reached the predetermined length of time.

18. The non-transitory computer readable storage medium according to claim 11, the process further comprising:
measuring a time period for which the sheet is being conveyed without allowing image formation;
determining whether the time period has reached the predetermined length of time; and
stopping the conveying of the continuous sheet when a predetermined time has elapsed after turning off a flash fixture, the flash fixture device being turned off when no toner image is present.

19. The image-forming apparatus according to claim 1, wherein the conveyance of the continuous sheet is stopped when a predetermined time has elapsed after turning off a flash fixture, the flash fixture device being turned off when no toner image is present.

20. The image-forming method according to claim 6, further comprising stopping the conveying of the continuous sheet when a predetermined time has elapsed after turning off a flash fixture, the flash fixture device being turned off when no toner image is present.

* * * * *